United States Patent Office 3,110,562
Patented Nov. 12, 1963

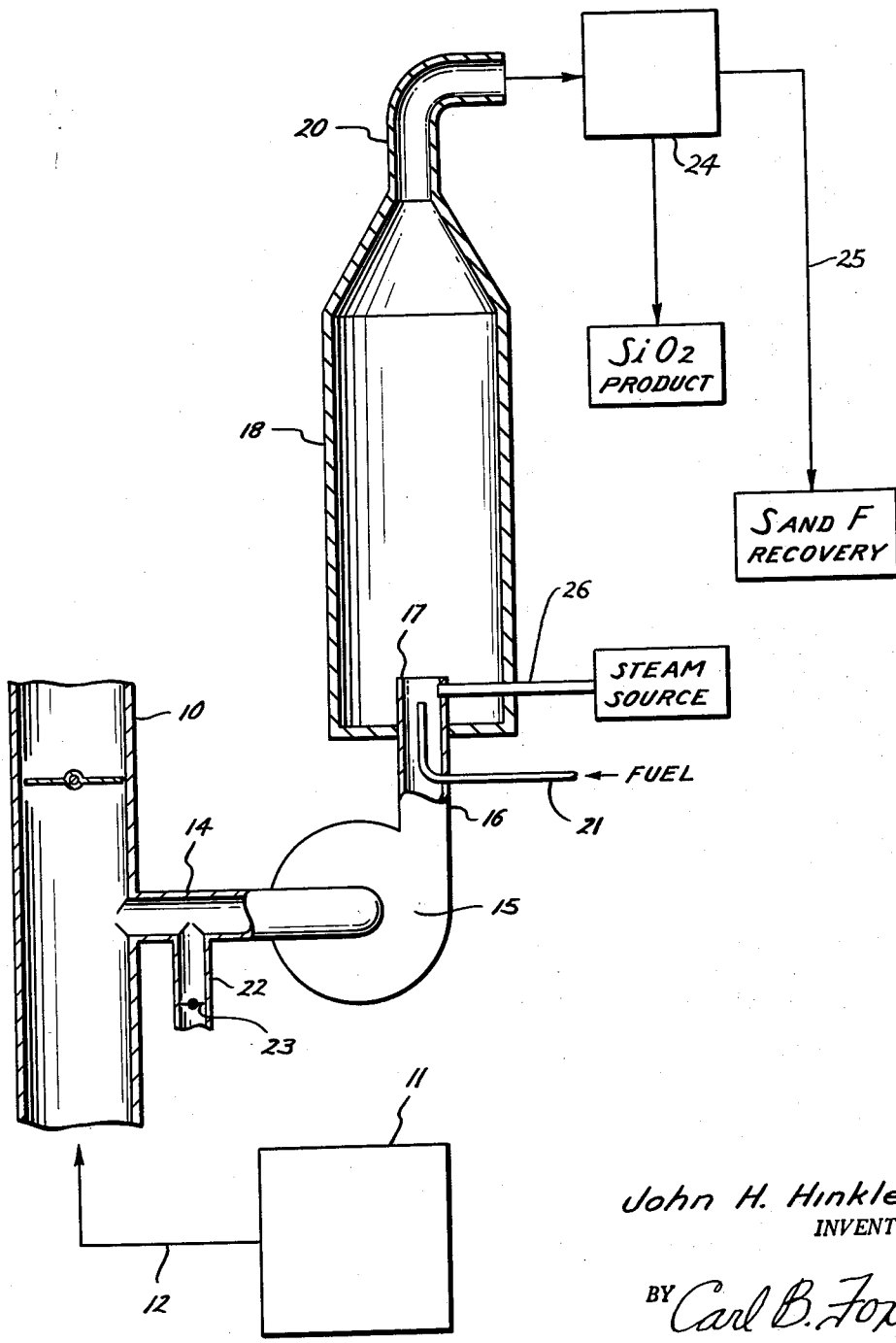

3,110,562
PROCESS FOR RECOVERY OF HF AND
$SiO_2$ FROM WASTE GASES
John H. Hinkle, Jr., Houston, Tex., assignor, by mesne assignments, to Hooker Chemical Corporation, New York, N.Y., a corporation of New York
Filed Jan. 26, 1960, Ser. No. 4,679
6 Claims. (Cl. 23—153)

This invention pertains to the treatment of gaseous effluents from processing of fluorine- and silicon-containing materials where significant amounts of fluorine and silicon are present in the gaseous effluents. The treatment applies particularly to processing of phosphorus ores with acids, but is equally suitable for use in connection with other systems from which fluorine may be evolved.

A principal object of the invention is to provide methods for removing and recovering fluorine from gaseous mixtures, particularly where at least a part of the fluorine is combined with silicon in the gaseous mixtures.

An equally important object of the invention is to provide such methods wherein silica of high purity is obtained as a valuable product in conjunction therewith.

Another object of the invention is to provide methods for recovering silica and fluorine from solid and/or liquid materials from which the silica and fluorine, usually combined, can be driven off by heat in volatile form.

Further objects of the invention are to provide such methods wherein fuel requirements are minimized, wherein atmospheric pollution hazards are minimized, wherein optimum recovery of raw materials is realized, and which are safe, reliable and economical.

In plants for processing of materials, such as ores, which have a substantial fluorine content, it is usually that at least some of the fluorine may be given off in gaseous form as waste stack gas, or the like, to create bad conditions of atmospheric pollution or to result in surface or stream pollution. The treatment herein presented is directed to the solution of such problems, as well as to provide methods for valuable product recovery and thereby to improve economic potentialities of such processes.

Briefly, the invention contemplates delivering silicon- and fluorine-containing gases and vapors to a heating or combustion zone under conditions to cause conversion of the fluorine to a form suitable for recovery, and at the same time to convert the silicon content to silica ($SiO_2$) of high purity.

In treatments of fluorine and silicon containing materials of the type referred to, the gaseous effluent contains fluorine and silicon primarily in the form of silicon tetrafluoride ($SiF_4$) which is gaseous under normal atmospheric conditions since the pure material has a boiling point of minus 65° C. (under 1810 millimeters of mercury pressure). Silicon tetrafluoride (or silicon fluoride, as the material is sometimes called) is very soluble in water, and, dissolved in water decomposes according to the chemical equation:

$$3SiF_4 + 2H_2O \rightarrow 2H_2SiF_6 + SiO_2$$

Processes based on the equation have been used to recover fluorine and silicon from gases by dissolution of the gases in water, usually with subsequent precipitation of the fluorine, but have not been particularly successful or economically advantageous since the $H_2SiF_6$ is not of high demand and the $SiO_2$ is of poor quality. The process herein presented results in recovery of fluorine as hydrofluoric acid (HF) and of the silicon as pure silicon dioxide ($SiO_2$), both of which are readily marketable products of relatively high value.

Other objects and advantages of the invention will appear from the following description of a preferred embodiment thereof, reference being made to the accompanying drawing which shows a schematic flow diagram of the method.

Referring to the drawing in detail, reference numeral 10 designates a section of a stack or other conduit which carries gases and vapors derived from a processing plant 11. Plant 11 is a processing plant wherein materials are processed or prepared giving forth gases and vapors which contain fluorine and silica. Most commonly, the fluorine and silica will principally be in combined form as silicon tetrafluoride ($SiF_4$), with perhaps additional quantities of fluorine present as hydrofluosilicic acid ($H_2SiF_6$) and/or hydrofluoric acid (HF). Other silicon complexes may perhaps also be present. Water and $SiF_4$ may react, $2H_2O + 3SiF_4 \rightleftharpoons 2H_2SiF_6 + SiO_2$, under certain conditions. The gases passing into conduit 10 from plant 11 through flow connection 12 may thus contain, in addition to $SiF_4$ and water vapor, which are necessary to the process, varying amounts of $H_2SiF_6$, HF, $SiO_2$ (in suspension), and other silicon materials.

Plant 11 may be of any type to produce the type of gases specified. Aluminum ore refining processes, phosphate acidulation processes, and other types of phosphate processes will most commonly produce the gas streams to which this invention is most suitably applicable.

For purposes of illustrating the invention, and by way of example and without limiting the invention, plant 11 may be a phosphate acidulation and calcination plant producing defluorinated tricalcium phosphate for use as animal and poultry mineral feed supplement as its principal product. Such a process is described in copending application for United States Letters Patent, S.N. 708,832, filed January 4, 1958, by John H. Hinkle, Jr., Everett J. Weaver, and Lynnval M. Smith, and entitled "Tricalcium Phosphate."

As has been stated, the gas stream flowing in through conduit 10 must contain fluorine and silicon in some mixture, usually as represented by left-hand portion of the chemical equation: $2H_2O + 3SiF_4 \rightleftharpoons 2H_2SiF_6 + SiO_2$. That is, the chemical reaction represented by the equation is such that substantially all of the materials are in the condition of the left-hand side of the equation when in the gaseous state. Only when there is water present in the liquid state, in large quantities, does the equation take place preponderately toward the right.

The gas in conduit 10 may also contain other components, depending on its source. Thus, when process 11 is an acidulation-calcination tricalcium phosphate unit, of the type represented by the aforesaid application S.N. 708,832, there will also be present in the gas sulphur compounds such as $SO_2$ and $SO_3$, $CO_2$, and $N_2$ and other inert atmospheric constituents. The $SO_2$ and $SO_3$ result from decomposition of sulphates in the calcination unit of the process. The $CO_2$ results from combustion of fuel for calcination and from the atmosphere.

In case process 11 is of another type, the gases may, of course, have a different composition.

A conduit 14 branching from conduit 10, leads the gases from conduit 10 to a fan or blower device 15 which discharges the gases through a conduit 16 leading to a burner device 17 within the lower end of a combustion chamber 18, or other heating device. Combustion chamber 18 is shown as a simple upright cylindrical shell having a top discharge 20 of reduced diameter. Any suitable apparatus may be substituted. Burner 17 may be of any suitable type for burning gas mixtures or for burning solid and/or liquid fuels mixed with gases.

A pipe 21 extends into chamber 18 axially within burner 17, of which pipe 21 may form a part, and usually terminates short of the upper end of the burner so that at least some gas mixing will occur within the burner before the gas mixture is introduced into the combustion zone thereabove. Pipe 21 carries a fuel gas, such as natural gas, or a liquid and/or solid fuel such as fuel oil, pulverized coal, fuel oil containing pulverized coal, or the like, into the combustion zone, as required.

Combustion chamber or heater 18, as will be realized, may be of either the direct fired type shown, with which the optimum results are usually obtainable, or may be an indirect fired type wherein the products of fuel combustion are not commingled with the treated gases. Where dilution of the treated gases is not desired, it will of course be preferred to use the indirect fired type of heater.

A pipe 22 having a flow shut-off such as damper 23 therein leads into conduit 14 at the suction side of blower 15 and serves for regulated introduction of air as required for proper combustion in chamber 18.

The gases discharged into combustion chamber 18 through burner 17 are regulated to possess combustion qualities to maintain the desired combustion temperature, to have an oxygen content sufficient to support combustion but with a minimum of residual oxygen in the gas exiting through conduit 20 after combination has taken place.

In application S.N. 708,832, heretofore mentioned, it is made clear that the best defluorinated tricalcium phosphate is made when alkylation grade sulphuric acid, or some other sulphuric acid containing significant amounts of carbonaceous materials, is used in the process. The bulk of the carbonaceous materials are driven off in the kiln gases in only partially combusted form, since the amount of excess oxygen introduced to the kiln burner is small and since the amount of oxygen derived from breaking down of $SO_3$ is small, as is fully explained in said application S.N. 708,832. In other words, there is an excess of carbonaceous material over that required in the kiln to consume excess oxygen introduced for fuel burning and oxygen derived from breaking down of $SO_3$, so that a major part of the carbonaceous material is driven off with the kiln gas outflow in a gaseous form suitable for use as a fuel.

Therefore, the method hereby presented may be carried out with exceptionally high fuel use efficiency in the combustion chamber when coupled with a defluorinated tricalcium phosphate process of a type offering exhaust gases containing fluorine and silicon as hereinabove described which also contains combustible carbonaceous materials. The process described in said application S.N. 708,832 exemplifies such a process.

The gas stream flowing into conduit 10 would in that case contain, in addition to the gaseous components already mentioned, gases resulting from the decomposition or breaking down of hydrocarbon materials from alkylation sulphuric acid. These hydrocarbon components are volatile carbon compounds, and are combustible in the presence of air or oxygen. In fact, surprisingly, it has been found that advantage may be taken of the fact that they are driven off in volatile form in the kiln and are present in volatile form in conduit 10 by using them as a fuel for heating the combustion chamber 18 so that only little, or sometimes no, fuel gas need be introduced through pipe 21 in order to maintain a proper temperature within the combustion zone.

Outlet 20 from combustion chamber 18 leads to a separator 24 wherein silica ($SiO_2$) of high purity is removed from the gas stream. Separator 24 may be of any suitable type, or may be a combination of types, of separators capable of removing silica from the gas stream. Preferably, separator 24 will comprise a high-velocity cyclone dust separator in combination with a bag filter type of dust separator. This system effectively and efficiently removes suspended silica or other dust from a gas stream.

A conduit 25 leads the gases from which the silicia has been removed for further processsing to recover sulphur and fluorine separately. These recoveries are preferably made according to the process set forth in co-pending application for United States Letters Patent, S.N. 707,116, filed January 6, 1958, by John H. Hinkle, Jr., Everett J. Weaver, and Lynnval M. Smith, and entitled "Waste Recovery Process and Apparatus." The present invention, however, is not limited to recovery of silicon and fluorine as set forth in that application, and other suitable recovery methods may be used.

When a recovery process according to application S.N. 707,116 is employed, the scrubbing liquor described therein should have a pH below 6.8, and may be as acid as is economically feasible. The limit of acidity of the scrubbing liquor is dictated by the absorptive power of the scrubbing solution, and absorption is also governed by temperature, variable from 32° F. upwards. If the pH is allowed to rise above the neutral point (6.8 pH) the fluorine compounds will obviously react with alkaline materials and form both silicofluorides and alkaline fluorides. Since the primary desire is to collect essentially silica-free materials at this point, pH maintenance below 6.8 is critical. The fluorides may be captured as silicofluorides in the scrubbing system and worked by known processes to form fluorides, providing the total recovered solution does not go below a ratio of one part fluoride to three parts silicofluoride in the scrubbing solution. Further information may be found in United States Patent Number 2,588,786 to Winter.

Considering now the chemical reactions which take place in the process briefly described above, the gas stream entering combustion chamber 18 by way of conduits 10, 14, blower 15, conduit 16 and burner 17, contain, as components essential to the process, silicon tetrafluoride and water vapor. Also present are the other gaseous components, previously described, which act as diluents. In case of the gases originating in a different process, the other gaseous components may differ. Oxygen and the carbonaceous components are essential components to the combustion which occurs in combustion chamber 18.

The gases passing from burner 17 into the combustion chamber may contain sufficient hydrocarbon componnents to support combustion in the chamber at a suitable temperature without addition of fuel through pipe 21. Steam is admitted through pipe 26 leading through the chamber sidewall and into the side of the burner in case the gases do not have sufficient water content.

In chamber 18, combustion takes place to heat the gases to a temperature sufficient to cause the chemical reaction, $SiF_4 + 2H_2O \rightarrow 4HF + SiO_2$, to proceed rapidly. The useful temperature range is between about 800° F. (416° C.) and about 3000° F. (1647° C.). The preferred temperatures are above 1500° F. (815° C.) so that the reaction will take place substantially to completion. It has been found that when the combustion chamber temperature is maintained at 1500° F., the conversion of $SiF_4$ to HF and $SiO_2$ is greater than 80%. At higher temperatures the conversion will be higher and at lower temperatures, lower. It will usually be uneconomic to operate the combustion chamber at a temperature considerably below 1500° F. because of the consequent reduction in recoveries of the products.

An important feature of novelty of the process should be considered. The fuel for maintaining the combustion chamber temperature is introduced in combination with the silicon and fluorine materials to be converted. In this manner, intimate contact with the flame and heating efficiency of the highest order are obtained in a simple manner. Where the fuel and materials to be converted are introduced in separate streams, there arises the problem of obtaining such contact and efficiency, but according to the preferred embodiment as herein described the optimum operation is readily attained.

In case of the fuel components of the gas to be treated are of an order of magnitude to substantially support the temperature condition required in the combustion chamber, all or at least a major portion of the fuel flow to the burner through pipe 21 can be shut off as soon as operation is under way and the combustion chamber temperature conditions are established, the fuel contained in the gas to be treated thereafter causing maintenance of the temperature. Only a small excess of oxygen to support combustion is maintained, as it has been found that higher excesses of oxygen retard the conversion.

The silica product is of very high purity and, therefore, readily salable at a high price. Silica produced according to the preferred process had an analysis according to the following Table I.

TABLE I

*Chemical Analysis of Recovered Silica*

| Component: | Percent by weight (except as noted) (dry basis) |
|---|---|
| $SiO_2$ | 90.02 |
| Fe | 0.0005 |
| Al | 0.35 |
| P | 2.32 |
| Ca | 5.39 |
| $SO_4$ | 1.66 |
| F | 0.42 |
| Mg _____parts per million__ | 75 |
| Cl | Slight trace |

(Spectrographic analysis showed no detectable amount of copper, manganese, zinc or other metals.)

The silica product is bone white in color and is in a uniform finely divided condition. Thus, the silica product is in a condition for use in many processes without subsequent treatment. The state of division makes it especially useful for reaction in chemical processes, and its relative chemical purity makes it far superior to natural sands and to most processed commercial sands. The low cost of its production by the described method places it in an advantageous economic position.

Because of possible reversion and/or contamination of the silica, its separation is preferably accomplished at a temperature above 300° F.

As stated earlier, the process may be combined with processes for the recovery of sulphur and fluorine, so that the overall efficiency and profit of operation may be improved.

While preferred embodiments of the invention have been shown and described, many modifications thereof may be made by a person skilled in the art without departing from the spirit of the invention, and it is intended to protect by Letters Patent all forms of the invention falling within the scope of the following claims.

I claim:

1. A process for treating waste gases obtained from processes, including acidulation of phosphatic minerals with alkylation-grade sulfuric acid, which waste gases contain fluorine and silica in at least one of the forms $SiF_4$ and $H_2SiF_6$, fluorine in the form of HF, $SiO_2$ in suspension, $H_2O$ vapor and combustible carbonaceous materials, which comprises admixing a fuel with the waste gases, the amount of said fuel being sufficient to initiate combustion of the waste gases when they are heated to their combustion temperature, establishing the content of the carbonaceous material in the waste gases so that combustion of said gases, once initiated, will continue without further fuel admixing, heating said waste gases to a temperature between about 800° F. and about 3000° F. so as to initiate combustion thereof, and, thereafter, discontinuing admixing of said fuel, whereby the combustion is maintained until substantially complete combustion of the waste gases is obtained and the hydrogen fluoride and silica produced are in recoverable form.

2. Process for the manufacture of silica and hydrogen fluoride from waste gases obtained from processes including acidulation of phosphatic minerals with alkylation-grade sulphuric acid containing carbonaceous impurities, which waste gases include fluorine and silica in at least one of the forms, silicon tetrafluoride and hydrofluosilicic acid, and fluorine in the form of hydrofluoric acid, said waste gases also including silicon dioxide in suspension, water vapor, and carbonaceous materials resulting from said alkylation-grade sulphuric acid, comprising the steps:

(1) igniting said carbonaceous materials of said waste gases to heat said waste gases to a temperature between about 800° F. and about 3000° F. to cause hydrofluosilicic acid to decompose into silicon tetrafluoride and hydrogen fluoride and to cause reaction between silicon tetrafluoride and water vapor to produce silica; and then, (2) after said carbonaceous materials of said waste gases have burned, separating the silica formed in (1) therefrom; and then, (3) separating the hydrogen fluoride from said waste gases after the silica has been removed therefrom by absorption thereof in water solution.

3. Process according to claim 2, said waste gases being heated in step (1) to a temperature between about 1500° F. and about 3000° F.

4. Process according to claim 2, including maintaining a temperature of said waste gases during step (2) of at least about 300° F.

5. Process according to claim 2, including adjusting the composition of said waste gases prior to step (1) to include oxygen only sufficient to support the burning of said carbonaceous materials in step (1).

6. Process according to claim 2, including adding combustible fuel to said waste gases prior to step (1) to increase and control the burning temperature in step (1).

References Cited in the file of this patent

UNITED STATES PATENTS

| 1,175,294 | Rasicot | Mar. 14, 1916 |
| 2,418,203 | Stauffer | Apr. 1, 1947 |
| 2,535,036 | Broughton | Dec. 26, 1950 |
| 2,631,083 | Engelson et al. | Mar. 10, 1953 |
| 2,635,946 | Weber et al. | Apr. 21, 1953 |
| 2,728,634 | Miller | Dec. 27, 1955 |
| 2,785,953 | Fitch | Mar. 19, 1957 |
| 2,791,490 | Wilcox | May 7, 1957 |
| 2,879,862 | Burden | Mar. 31, 1959 |
| 2,886,414 | Secord | May 12, 1959 |
| 2,963,344 | Tarbutton et al. | Dec. 6, 1960 |

FOREIGN PATENTS

| 726,250 | Great Britain | Mar. 16, 1955 |
| 550,812 | Canada | Dec. 31, 1957 |